July 31, 1951 J. A. RADO 2,562,476

AMPLIFIER ARRANGEMENT

Filed March 27, 1946

*INVENTOR.*
JOHN A. RADO,

*BY* Harry C. Page

ATTORNEY.

Patented July 31, 1951

2,562,476

UNITED STATES PATENT OFFICE 2,562,476

AMPLIFIER ARRANGEMENT

John A. Rado, Nutley, N. J., assignor to Hazeltine Research, Inc., Chicago, Ill., a corporation of Illinois Application March 27, 1946, Serial No. 657,398

6 Claims. (Cl. 179—171)

Figure 1:
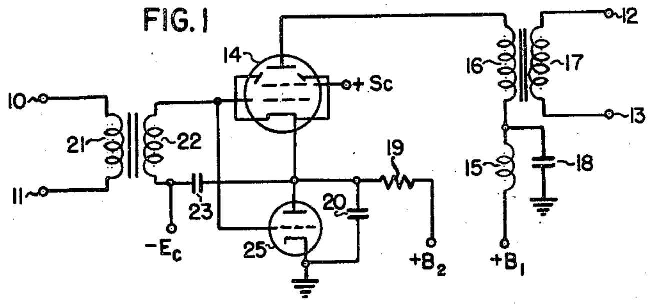

This invention relates, in general, to amplifier arrangements and is particularly directed to the improvement of voltage regulation in such arrangements. The invention is subject to a wide variety of applications and may be relied upon, for example, to obtain improved regulation in pulse-modulated amplifier systems or in push-pull circuits wherein each of the push-pull connected tubes may be said to have pulse operation. The expression "pulse operation" is here used generically to include such familiar modes of operation as Class B, Class C, or pulse modulation.

Vacuum-tube circuits designed for pulse operation are well known in the art. By way of illustration, an amplifier system for pulse-modulated signals of positive polarity may comprise a vacuum tube normally biased to cutoff and having an input circuit for receiving pulse-modulated signals as well as an output circuit from which the amplified signals may be derived. An amplifier of this type is frequently employed to supply an excitation potential to the oscillatory system of a power transmitter intended for pulse-modulated operation.

Where the described amplifier system has a conventional power supply, it is found that the direct current component varies with the repetition frequency of the pulse-modulated signals, causing an undesirable variation in the anode-cathode potential of the amplifier tube. Usually, the cathode is maintained at ground potential and the anode potential tends to decrease as the repetition frequency increases. The resulting variation in anode-cathode potential represents poor regulation and causes the power output of the amplifier to change with the repetition frequency which is undesirable for most installations.

Arrangements of the type mentioned above are sometimes equipped with elaborate regulated power supplies to avoid the tendency toward power variations with changes in repetition frequency. However, such regulated power-supply systems are unduly complicated and expensive when constructed to afford close regulation in pulse-modulated signal-translating circuits.

It is an object of the present invention, therefore, to provide an amplifier arrangement especially suited for pulse operation and which avoids one or more of the aforementioned limitations of prior arrangements.

It is another object of the invention to provide an amplifier arrangement suited for pulse operation and having an improved voltage regulation.

It is a specific object of the invention to provide an amplifier arrangement for pulse operation including a simplified and inexpensive voltage-regulating system.

An amplifier arrangement for translating pulse-modulated signals, in accordance with the present invention, comprises an electron-discharge device, having an anode, a cathode, and a control electrode. An anode-cathode circuit is provided for the discharge device and includes a first and second source of unidirectional potential connected with opposed polarities and having such relative magnitudes as to establish a predetermined potential difference between the anode and cathode. The arrangement has means for applying signals to the cathode and control electrode of the discharge device for translation therethrough. The arrangement includes means coupled to the above-mentioned control electrode for integrating the applied signals to develop a control voltage having an amplitude determined by the amplitude and repetition frequency of the aforesaid signals. It also has a control system responsive to the aforesaid control voltage for varying the effective magnitude of the smaller one of the potential sources to compensate, at least in part, variations in the potential difference between the anode and cathode resulting from translation of the applied signals.

For a better understanding of the present invention, together with other and further objects thereof, reference is had to the following description taken in connection with the accompanying drawing, and its scope will be pointed out in the appended claims.

Figure 2:
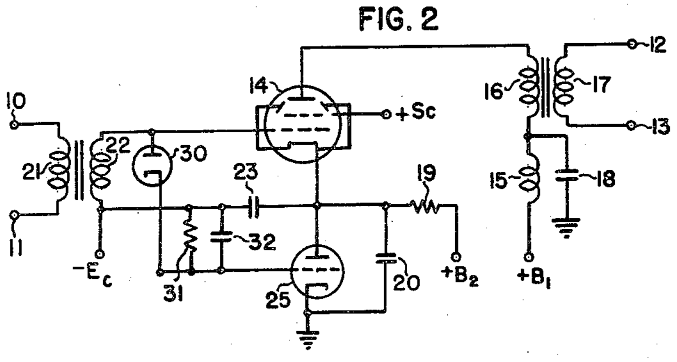
Figure 3:
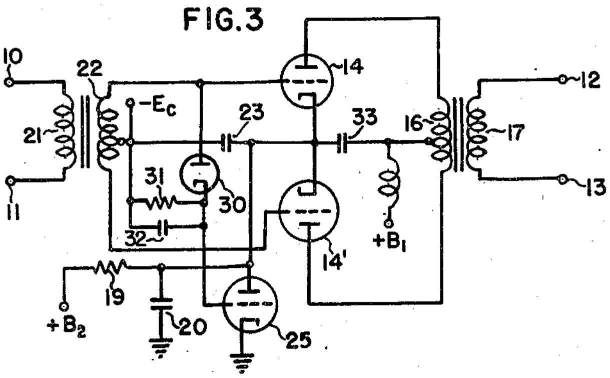

In the drawing, Fig. 1 is a schematic circuit diagram of a signal-translating arrangement embodying the invention in one form; Fig. 2 is an arrangement similar to that of Fig. 1 but including the invention in a modified form; while Fig. 3 represents a push-pull system having a voltage regulator constructed in accordance with the invention.

Referring now more particularly to Fig. 1, there is represented a signal-translating arrangement in accordance with the present invention having input terminals 10, 11 and output terminals 12, 13. The arrangement will be considered as an amplifier for amplifying pulse signals applied to input terminals 10, 11 and for supplying to its output terminals 12, 13 amplified signals suitable for controlling apparatus intended to respond to pulse signals, such as a pulse-modulated power transmitter. The arrangement comprises an electron-discharge device 14 shown as a tube of the beam-power type having an anode, a cathode, a screen, beaming electrodes and a control electrode. Tube 14 has an anode-cathode circuit including a first and a second source of unidirectional potential connected with opposed polarities and having such relative magnitudes as to establish a predetermined potential difference between the anode and the cathode. More specifically, an anode-ground circuit is provided for the tube and includes a first source of potential indicated $+B_1$ for establishing an anode potential that is positive with reference to the cathode. This source is connected with the anode through a filter choke 15 and the primary winding of a pulse transformer 16, 17. The source is by-passed in conventional manner by a condenser 18, which simultaneously smooths the power-supply ripple and by-passes signal currents. The anode-cathode circuit of tube 14 is completed by way of a cathode-ground circuit including a second source of potential indicated $+B_2$. The high-potential terminal of source $+B_2$ is connected to the cathode of the tube through a resistor 19 and is by-passed by a condenser 20. The negative terminals of each source $B_1$ and $B_2$ are grounded so that the sources are connected with opposed polarities in the anode-cathode circuit of tube 14. The source $+B_2$ is lower in voltage than the source $+B_1$ so that the cathode is at a less positive potential than the anode by a predetermined desired potential difference.

The arrangement has means for applying pulse-modulated signals of positive polarity to the control electrode of tube 14 with respect to its cathode for translation therethrough. This means includes a second pulse transformer 21, 22 the primary winding of which is connected with input terminals 10, 11 while its secondary winding is connected between the cathode and control electrodes of tube 14 through a blocking condenser 23. A source of bias potential $-E_c$ is connected with the control electrode of the tube by way of the secondary winding of transformer 21, 22 and has such value as normally to maintain the tube at or beyond anode current cut-off. Amplified signals translated through the tube are delivered to output terminals 12, 13 through the transformer 16, 17 having a secondary winding directly connected with these output terminals.

In order to regulate the anode-cathode potential of tube 14 in accordance with the teachings of the invention, the arrangement under consideration has a control system responsive to the applied signals for varying the effective magnitude of the smaller potential source $+B_2$ to compensate, at least in part, variations in the potential difference between the anode and cathode otherwise resulting from an increase of average anode current attendant upon the translation of the applied signals. This control system includes a second electron-discharge device, specifically a triode vacuum tube 25. The anode and cathode of tube 25 are connected across the source $+B_2$ and its condenser 20 and provide a conductive path thereacross during operating intervals in which tube 25 is rendered conductive. Normally, the tube is maintained in a monconductive state by the bias source $-E_c$ since the control electrode of tube 25 has a direct current connection with the control electrode of tube 14. This connection between the control electrodes of tubes 14 and 25 provides means for applying the input signals to tube 25 to control the conductivity thereof as required to effect the desired voltage regulation in a manner to be made clear presently.

In considering the operation of the described arrangement, assume initially that no signals are applied at input terminals 10, 11. For this condition, condenser 18 is charged to the value of source $+B_1$, establishing a desired anode potential which is positive with reference to ground. Similarly, condenser 20 is charged to the value of source $+B_2$, causing the cathode potential of tube 14 to be positive with reference to ground but less positive than the anode by a predetermined desired amount. If a pulse-modulated signal be applied to the input terminals, each pulse thereof is delivered with positive polarity to the control electrodes of tubes 14 and 25. These tubes are rendered conductive and the applied signal is amplified by tube 14 and supplied to output terminals 12, 13 in the usual manner. The translation of each pulse by tube 14 effects a slight discharge of condenser 18 and thus tends to reduce its own anode potential. However, tube 25 completes a shunt path around condenser 20 to discharge this condenser a like amount. The discharging of condenser 20 reduces the effective magnitude of the source $+B_2$ as applied to the cathode of tube 14 and is such as to compensate the variation in anode potential of tube 14 resulting from the translation of the applied pulse. In other words, tube 25 is rendered conductive by the applied signal and provides a closed conductive path associated with the source $+B_2$ and its condenser 20 for the duration of each pulse of the applied signal. The flow of current from source $+B_2$ and condenser 20 through this shunt path decreases the potential of the cathode of tube 14 to an extent which compensates the reduction of anode potential provoked by the translation of the applied signal by tube 14. In this manner the average anode-cathode potential difference of tube 14 is maintained substantially constant. It is, of course, possible to proportion the arrangement to under-, exactly, or over-compensate for voltage regulation as may be desired.

The described arrangement may be considered as operating in a pulse-by-pulse fashion in which the effective value of the smaller source $+B_2$ is adjusted within the duration of each translated pulse to the extent required to effect the desired compensation. Conpensation may be achieved for a wide range of repetition frequencies of the applied pulses. For this purpose the charging and discharging time constants of condenser 20 are selected to be substantially the same as the charging and discharging time constants of condenser 18.

The arrangement of Fig. 2 represents what is considered to be the preferred form of the invention. It is disclosed in conjunction with a translating circuit similar to that of Fig. 1, corresponding components thereof being identified by the same reference characters. In Fig. 2, tube 25 is responsive to an amplitude characteristic, namely, the average amplitude value of the applied signals for controlling the effective value of the smaller source $+B_2$ to compensate variations in the anode potential of tube 14. To this end, an integrating circuit is included in the Fig. 2 arrangement. It comprises a diode detector 30 connected across the secondary winding of pulse transformer 21, 22 by way of a time-constant load circuit in the form of a resistor 31 and a parallel-connected condenser 32. The integrating circuit has a fast-charging time constant and a discharge-time constant that is long with reference to the period between the succeeding pulses of the applied pulse-modulated signals. Elements 31 and 32 of the integrating circuit develop and apply to the control electrode of tube 25 a control voltage of positive polarity having an amplitude determined by the amplitude and repetition frequency of the applied signals. The control voltage controls the conductivity of tube 25 to vary the cathode potential of tube 14 and maintain its anode-cathode potential substantially constant.

Where the applied signals have constant amplitudes but variable repetition frequencies, it is apparent that the average direct current component of tube 14 varies directly with the repetition frequency. Variations in the direct current components produce corresponding variations in the anode potential of tube 14, varying the anode potential directly with the repetition frequency of the applied pulses. The control voltage applied to tube 25 also varies directly with the repetition frequency of the applied signals, rendering the tube more conductive for signals of higher repetition rates. Thus, as tube 25 is rendered more conductive, it decreases the cathode potential of tube 14 compensating for the corresponding decrease in the anode potential to maintain a substantially constant excitation potential. The operation of the Fig. 2 arrangement differs from that of Fig. 1 in two respects. First, tube 25 in the usual case is conductive during the interval between pulses of the applied signals, whereas in Fig. 1 tube 25 is conductive only during the pulse intervals. Secondly, the pulse current of tube 14 is translated primarily by condenser 20 in Fig. 2, but is carrried primarily by tube 25 in Fig. 1.

For one embodiment of the Fig. 2 arrangement the following circuit elements and conditions may be used:

| | |
|---|---|
| Tube **14** | Type 3D21 |
| Tube **25** | Type 2A3 |
| Resistor **19** | 5000 ohms |
| Resistor **31** | 100,000 ohms |
| Condenser **18** | 0.5 microfarad |
| Condenser **20** | 2 microfarads |
| Condenser **23** | 2 microfarads |
| Condenser **32** | 2 microfarads |
| Source $+B_1$ | 3000 volts |
| Source $+B_2$ | 400 volts |
| Source $-E_c$ | —100 volts |
| Source $+S_c$ | 1000 volts |
| Peak amplitude of applied pulses | +500 volts |
| Pulse duration of applied signals | 1 microsecond |
| Range of repetition frequencies | 0–1000 per second |
| Variation in average plate current of tube **14** over range of repetition frequencies | 0–10 milliamperes |

The application of the invention to a circuit of the push-pull type is illustrated in Fig. 3. Except for the necessary push-pull circuit connections, the arrangement is generally the same as that of Fig. 2 and corresponding components are designated by the same reference characters. The push-pull tubes are indicated 14 and 14'. Their anodes are connected to opposite ends of the primary winding of transformer 16, 17 while their control electrodes are connected in similar fashion to the secondary winding of transformer 21, 22. Condensers 23 and 33 connect the tube cathodes to center taps of windings 22 and 16, respectively. The tubes are biased near cutoff by the source $-E_c$. This arrangement may operate in conventional push-pull manner to translate signals from input terminals 10, 11 to output terminals 12, 13. Each of the tubes 14 and 14' is conductive for no more than one-half cycle of an applied alternating current signal so that each tube may be considered to have pulse operation as defined above. The integrating circuit, including diode 30, controls the cathode potential of each tube as described in connection with Fig. 2 to maintain a substantially constant anode-cathode excitation potential.

Voltage regulation is accomplished in each of the described arrangements through a relatively simple and inexpensive regulating system. The regulation may be obtained with pulse-modulated operation over a wide range of repetition frequencies.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An amplifier arrangement for translating pulse-modulated signals comprising, an electron-discharge device having an anode, a cathode and a control electrode, an anode-cathode circuit for said device including a first and a second source of unidirectional potential connected with opposed polarities and having such relative magnitudes as to establish a predetermined potential difference between said anode and said cathode, means for applying signals to said cathode and control electrode of said device for translation therethrough, means coupled to said control electrode for integrating said applied signals to develop a control voltage having an amplitude determined by the amplitude and repetition frequency of said signals, and a control system responsive to said control voltage for varying the effective magnitude of the smaller one of said potential sources to compensate at least in part variations in the potential difference between said anode and cathode resulting from the translation of said signals.

2. An amplifier arrangement for translating pulse-modulated signals comprising, an electron-discharge device having an anode, a cathode and a control electrode, an anode-cathode circuit for said device including a first and a second source of unidirectional potential connected with opposed polarities and having such relative magnitudes as to establish a predetermined potential difference between said anode and cathode, means for applying signals to said cathode and control electrode of said device for translation therethrough, means including a rectifier device for integrating said applied signals to develop a control voltage having an amplitude determined by the amplitude and repetition frequency of said signals, and a control system responsive to said control voltage for providing a closed conductive path across the smaller one of said potential sources to vary the effective magnitude of said smaller source and compensate at least in part variations in the potential difference between said anode and cathode resulting from the translation of said signals.

3. An amplifier arrangement for translating pulse-modulated signals comprising, an electron-discharge device having an anode, a cathode and a control electrode, an anode-cathode circuit for said device including a first and a second source of unidirectional potential connected with opposed polarities and having such relative magnitudes as to establish a predetermined potential difference between said anode and cathode, means for applying signals to said cathode and control electrode of said device for translation therethrough, a second electron-discharge device connected across the smaller one of said potential sources, means including a resistor and a parallel-connected condenser for integrating said applied signals to develop a control voltage having an amplitude determined by the amplitude and repetition frequency of said signals, and means for applying said control voltage to said second device to control the conductivity thereof and vary the effective magnitude of said smaller source to compensate at least in part variations in the potential difference between said anode and cathode resulting from the translation of said signals.

4. An amplifier arrangement for translating pulse-modulated signals of positive polarity comprising, an electron-discharge device having an anode, a cathode and a control electrode, an anode-cathode circuit for said device including a first and a second source of unidirectional potential connected with opposed polarities and having such relative magnitudes as to establish a predetermined potential difference between said anode and cathode, a biasing source for normally maintaining said device substantially at anode current cutoff, means for applying signals to said cathode and control electrode of said device for translation therethrough, means coupled to said control electrode for integrating said applied signals to devedop a control voltage having an amplitude determined by the amplitude and repetition frequency of said signals, and a control system responsive to said control voltage for decreasing the effective magnitude of the smaller one of said potential sources to compensate at least in part variations in the potential difference between said anode and cathode resulting from the translation of said signals.

5. An amplifier arrangement for translating pulse-modulated signals comprising, a first electron-discharge device having an anode, a cathode and a control electrode, an anode-cathode circuit for said device including a first and a second source of unidirectional potential connected with opposed polarities and having such relative magnitudes as to establish a predetermined potential difference between said anode and cathode, a biasing source for normally maintaining said device substantially at anode current cutoff, means for applying signals to said cathode and control electrode of said device for translation therethrough, a second electron-discharge device connected across the smaller one of said potential sources, means for integrating said applied signals to develop a control voltage having an amplitude determined by the amplitude and repetition frequency of said signals, and a control system for utilizing said control voltage to control the conductivity of said second device to vary the effective magnitude of said smaller source and compensate at least in part variations in the potential difference between said anode and cathode resulting from the translation of said signals.

6. An amplifier arrangement for translating pulse-modulated signals comprising, an electron-discharge device having an anode, a cathode and a control electrode, an anode circuit for said device including a first source of unidirectional potential for establishing a positive anode potential, a cathode circuit for said device including a second source of unidirectional potential for establishing a cathode potential that is less positive than said anode potential by a predetermined potential difference, means for applying signals to said cathode and control electrode of said device for translation therethrough, means including a rectifier device and a time-constant load network for integrating said applied signals to develop a control voltage having an amplitude determined by the amplitude and repetition frequency of said signals, and a control system responsive to said control voltage for varying the effective magnitude of said second potential source to compensate at least in part variations of said anode potential resulting from the translation of said signals.

JOHN A. RADO.

REFERENCES CITED

The following references are of record in the file of this patent:

UNITED STATES PATENTS

| Number | Name | Date |
|---|---|---|
| 1,857,901 | Walsh | May 10, 1932 |
| 2,032,193 | White | Feb. 25, 1936 |
| 2,232,212 | Cary | Feb. 18, 1941 |
| 2,392,415 | Soller | Jan. 8, 1946 |
| 2,404,099 | Schade | July 16, 1946 |
| 2,431,973 | E. L. C. White | Dec. 2, 1947 |

FOREIGN PATENTS

| Number | Country | Date |
|---|---|---|
| 413,390 | Great Britain | July 19, 1934 |
| 540,834 | Great Britain | Oct. 31, 1941 |